United States Patent [19]

Hussey

[11] 3,870,553

[45] Mar. 11, 1975

[54] CELLULAR CONCRETE UNIT COATED WITH AIR PERMEABLE, WATER REPELLENT CONCRETE COATING

[75] Inventor: Edward B. Hussey, Beaconsfield, Quebec, Canada

[73] Assignee: Domtar Limited, West Montreal, Canada

[22] Filed: Mar. 30, 1973

[21] Appl. No.: 346,703

Related U.S. Application Data

[63] Continuation-in-part of Ser. No. 152,985, June 4, 1971, abandoned.

[30] Foreign Application Priority Data

July 8, 1970 Canada .................................. 87712

[52] U.S. Cl.................. 117/123 A, 106/90, 106/97, 117/70 S, 117/123 D, 260/29.6 S, 260/29.7 S
[51] Int. Cl........................... B32b 13/04, C04b 7/02
[58] Field of Search .......... 117/123 A, 70 S, 123 D; 106/90, 97; 260/29.6 S, 29.7 S

[56] References Cited
UNITED STATES PATENTS

| | | | |
|---|---|---|---|
| 2,522,116 | 9/1950 | Hayes ..................................... | 52/612 |
| 2,905,566 | 9/1959 | Schmidt .......................... | 260/29.6 S |
| 3,354,169 | 11/1967 | Shafer et al..................... | 117/123 D |
| 3,437,619 | 4/1969 | Nutt....................................... | 106/90 |
| 3,477,979 | 11/1969 | Hillyer ................................. | 106/90 |
| 3,538,036 | 11/1970 | Peters .................................. | 106/90 |

*Primary Examiner*—William D. Martin
*Assistant Examiner*—William H. Schmidt
*Attorney, Agent, or Firm*—C. A. Rowley

[57] ABSTRACT

A precast concrete building unit is disclosed consisting of a light-weight cellular concrete block or slab having a coating of dense high-strength concrete. The dense concrete coating contains essentially Portland cement, a siliceous aggregate formed from two distinct fractions namely a coarse fraction all of which passes a 30 mesh screen and at least 70 percent is in the −40 to +100 mesh range and a fine sand fraction of a particle size −200 mesh, and a resin binder. The proportions of the various constituents are adjusted to obtain a building unit having substantial waterproofness and a permeability to water vapour within narrow limits. A thin primer coat of a resin emulsion, the same as or compatible with the resin binder, may be applied to the concrete building unit prior to application of the dense concrete coating. A thin coat of a resin may also be applied over the dense concrete coating.

6 Claims, No Drawings

CELLULAR CONCRETE UNIT COATED WITH AIR PERMEABLE, WATER REPELLENT CONCRETE COATING

This application is a continuation-in-part of U.S. patent application Ser. No. 152,985 filed June 4, 1971 now abandoned.

FIELD OF INVENTION

This invention relates to a precast concrete building unit, more particularly to a precast concrete block or slab consisting of light-weight cellular concrete and at least one finishing layer of dense, high-strength concrete.

DESCRIPTION OF PRIOR ART

Light-weight cellular concrete blocks or slabs have found many applications in the construction of buildings, particularly as elements of the roof or wall structure, or partitions, etc., where their thermal insulation properties and a desirable strength-to-weight ratio make their use particularly advantageous. However, when it is to be used in external walls, cellular concrete material generally requires a protective coating, primarily for the purpose of preventing the penetration of undue amounts of moisture from rain, snow, etc., into the wall. Such coatings have sometimes been provided in the past, e.g., in the form of water-repellent silicon-containing coatings, or more often in the form of paint. Coatings have also been proposed consisting of a layer of resin, e.g., polyester resin, having aggregate embedded therein. These coatings had serious disadvantages in that on the one hand they were, in most cases, non-breathing (i.e., non-permeable to water vapour) while, on the other, hand, being essentially organic in composition, they were often not as durable or resistant to the elements as might be desirable. Furthermore, these coatings had, in most cases, a coefficient of expansion so different from the cellular concrete substrate that changes in temperature inevitably resulted in cracking or spalling of the coating, and even more frequently of the substrate.

For a protective coating on cellular concrete to be viable, several conditions must be met. The coating material must, of course, be resistant to the elements and must possess a coefficient of thermal expansion substantially of the order of the coefficient of expansion of concrete if it is to resist the frequent temperature changes occurring during the year. Then, the material must have a degree of water repellency and also, depending on the circumstances in which the concrete slab or block is to be applied, a greater or lesser capacity for "breathing."

The problem of "breathability" (i.e., permeability to vapour) of cellular concrete has not been fully explored in the industry, but disregard of the problem is known to have led, in some cases, to a breakdown of the material. The cellular structure of the material permits generally the relatively free passage of air and vapour therethrough. But when the pores of the material are closed in the outer surface, as e.g., when a non-breathing paint is applied, the free passage is interrupted. Where the relative humidity inside a building is higher than outside, there may be, in the winter, (and unless free intercommunication is otherwise assured, e.g., by venting), an accumulation of moisture inside the wall material in an area close to the outer surface; with the alternation of freezing and thawing the presence of this moisture may cause damage to the material. Hence a controlled degree of breathability may in some cases be included in the specifications for the material and, in any event, the ability to control the permeability to vapour of the precast concrete units is a most desirable tool in the hands of the manufacturers. On the other hand, permeability to vapour often goes together with permeability to liquid water, a rather undesirable feature where cellular concrete is concerned. Hence, in providing a suitable coating for such concrete it is essential to ensure that, if the coating has the right degree of if permeability to vapour, it remains nevertheless substantially impermeable to water.

As is well known in the manufacture of cellular concrete the slab passes through an autoclave and contains a large amount of water immediately after it is produced. This contained water must escape from the slab and thus heretofore no sealing coating could be applied to the slab immediately after production, i.e., "in plant." The coating of the present invention provides waterproofness yet incorporates sufficient breathability to permit the water trapped within the cellular concrete during production to escape as vapour after the coating has been applied and thus permits in plant application of the coating to the cellular concrete thereby reducing the cost of the resultant panel.

SUMMARY OF THE INVENTION

I have found that a coating for cellular concrete answering the above requirements can be prepared from an aqueous mixture containing an inorganic cementitious binder, sand of a suitable particle size distribution, and a resin emulsion.

The present invention accordingly provides a precast concrete building unit consisting essentially of a light-weight cellular concrete unit in the form of a block, slab, or the like having on at least one face thereof and integral therewith a finishing layer of a dense high-strength concrete material, said dense concrete material consisting essentially of an inorganic cementitious binder, a siliceous aggregate containing a coarse fraction having a least 70 percent in the −40 to +100 mesh range and at least a minor fraction of a particle size −200 mesh, and a resin binder.

DESCRIPTION OF PREFERRED EMBODIMENTS

Light-weight concrete is well-known in the art. One such type of concrete, known in the trade as "Siporex," is prepared from an aqueous mixture of Portland cement and silica sand in which is dispersed a small quantity of aluminum powder, the reaction of said powder with lime and/or soluble alkali from the cement resulting in the formation of gas bubbles randomly distributed throughout the cementitious mass. The mass is moulded, allowed to set and cured with steam. In certain types of cellular concrete, lime may be used in the place of Portland cement, and a variety of blowing agents may be used, sometimes light-weight aggregate is incorporated in the concrete. Generally, light-weight concrete will embrace the various categories of concrete having a specific gravity of about 50 lbs/ cu.ft. or less. Many such types of light-weight concrete are known in the trade and they are all contemplated for use in this invention.

The coating of this invention is prepared from an aqueous mixture of a cementitious binder, e.g., Portland cement, a resin emulsion and sand of a suitable particle size distribution. I have found that to control the breathing characteristics of the cementitious coating within a desirable range, while at the same time maintaining the water repellency of the material at the desired level, it is necessary to use an aggregate consisting of two separate and distinct fractions namely a coarse sand fraction and a fine sand fraction.

It has been found that the coarse fraction should have a specific particle size such that substantially all passes through a 30 mesh screen and a portion consisting of at least 70 percent of the coarse fraction must be in the −40 mesh to +100 mesh size range. If the particle size of the coarse fraction is too large, the object of the present invention will not be obtained and similarly if the particle size of the coarse fraction is too small. The permeability of the coating will be below the minimum required and the product will be unsatisfactory.

The fine fraction on the other hand should be of very small particle size with less than 10 percent being retained on a 200 mesh screen.

If a very high degree of water repellency combined with a relatively low breathability is required a higher proportion of fine fraction will be required in the aggregate. On the other end of the scale a relatively low ratio of fine to coarse fractions will produce a coated slab of greater vapour permeability and somewhat lower repellency.

This ratio of fine to coarse fractions is the relationship between the −200 mesh fine fraction and the −40 to +100 mesh portion of the coarse fraction since it is only this portion of the coarse fraction that is of major significance in determining the characteristics of the resultant products. It has been found that there should be at least 12 percent fine fraction based on the total of the fine fraction plus the −40 to +100 mesh portion of the coarse fraction and preferably more than 20 percent. On the other hand, the amount of fine fraction to the −40 to +100 mesh portion of the coarse fraction should not exceed at 2 to about 3 ratio. In any event, the ratio of the fine to the −40 to +100 mesh portion of the coarse fraction will be correlated to retain the required degree of vapour permeability and water repellency.

Other siliceous materials may be used instead of the sand, for example wollastonite slag, fly ash, volcanic glasses, etc., may be used as aggregate for either the coarse of the fine fraction or both. It is, however, important that as above indicated the aggregate consist of the two distinct fractions having the particle size distributions described above.

The cementitious binders are preferably Portland cement, pozzolanic cements, high alumina cements, or mixtures of cement and lime such as are generally used in the concrete art. The proportion between the cementitious binder and the siliceous aggregate can vary within wide limits, but will preferably be between 1 : 4 and 3 : 4.

The resin emulsion incorporated in the mixture is preferably an acrylic latex, several variations of which are available in commerce. An example is the acrylic latex manufactured by Rohm & Haas Company and sold under the name of "Rhoplex." Alternatively a styrene-butadiene resin latex can be used or a polyvinylidene chloride emulsion, both manufactured by Dow Chemical Co. The proportion of resin incorporated in the mixture may vary according to the type of resin and also with the ratio of fine to coarse sand included as aggregate. With an acrylic latex as the organic component I have found that a most suitable ratio will be 2 to 12 percent of latex solids to total solids in the mixture.

The aqueous mixture thus prepared is applied to the cured and hardened light-weight concrete substrate by spraying, trowelling, or any other convenient procedure, said mixture then setting into a hard, dense, high-strength concrete coating. If desired, a thin primer coat of a resin emulsion may be first applied to the light-weight concrete, the resin being substantially the same as, or compatible with, the resin used in the mixture. The coating is applied on the cellular concrete substrate to a thickness, preferably, between 1/16 and ¼ inch. If desired, a layer of sand or other granules or any other aggregate may be further applied to the surface of the freshly coated concrete and embedded therein for protection or for aesthetic effects. Also, if desired, a thin coat of resin, e.g., of acrylic resin, may be further applied over the dense concrete coating or the surface layer of sand or granules, as the case may be to improve the cleanibility and corrosion resistance of the coating. However, care must be taken in such case not to impair the breathability of the material.

The resulting coated slabs have a vapour permeability which can be substantially exactly controlled between 0 and about 12 perms, and are substantially water repellent. In a great number of cases slabs are desired having a vapour permeability between about 6 and 12 perms and the water repellency is greater than 90 percent and such slabs will be obtained by the present invention. Moreover, the coats have a coefficient of expansion which is substantially equal to that of the substrate, and for these reasons their resistance to temperature change is excellent. The coating may be coloured by addition of dyes pigments to the cementitious mixture.

The test for vapour permeability is the ASTM C-355 "Water Vapour Transmission of Thick Materials" described in detail in the example hereinbelow, the units of permeance being the customary U.S. units of perms (grains/ft$^2$ hr. 1 inch Hg). The test for water repellency is also described in detail in the example below and is based essentially on a simulation of rain under controlled conditions, the percentage water repellency being essentially a relative measure of the repellency of a coated slab relative to the noncoated light-weight concrete constituting the substrate.

The following examples will further illustrate the invention, but it is to be understood that the conditions disclosed in the examples are merely illustrative and are not to be interposed as limiting the invention thereto.

EXAMPLE

Four dry powder mixes, respectively referred to as A, B, C and D, were prepared from white Portland cement and sand, the sand consisting of a mixture of coarse sand and fine sand, designated respectively as "70 mesh" and "−200 mesh," in the respective ratios of 3 : 2, 7 : 3, 4 : 1 and 9 : 1. The ratio of Portland cement to the aggregate was 40 : 60. A screen analysis of the coarse and the fine sand was as follows:

| Retained on U.S. No. | Coarse Sand ("70 mesh") | Fine Sand ("-200 mesh") |
|---|---|---|
| 30 | 0 | 0 |
| 40 | 0.3 | 0 |
| 50 | 3.2 | 0 |
| 70 | 56.8 | 0 |
| 100 | 28.9 | 0.1 |
| 140 | 9.1 | 0.8 |
| 200 | 1.4 | 7.4 |
| 270 | 0 | 11.0 |
| pan | 0.3 | 80.7 |

Four separate matrix materials were prepared by mixing 78 percent by weight of each dry powder mix with 13 percent Rohm and Haas Rhoplex E-330 acrylic polymer (47 percent solids content), 9% $H_2O$ and 100 ppm Dow Corning Anti-foam B by weight. These mixes were sprayed as separate matrices at a rate of approximately 0.5 lb/ft$^2$ on light-weight concrete blocks, known in the trade as "Siporex" blocks precoated with a primer of 50:50 Rhoplex E-330 and $H_2O$ (0.12 lb/ft$^2$). Immediately after spraying of the matrix material, Indusmin No. 16 mesh sand aggregate was applied on the surface at a ratio of 0.21 lb/ft$^2$ using a Joanit Hopper Gun.

Two samples of each of the four materials were evaluated for water vapour permeability by the ASTM C-355, "Water Vapour Transmission of Thick Materials," dessicant method. The test specimen samples were cut into 4½ inches diameter circles consisting of approximately 3/32 to 1/8 inch of matrix material and sand aggregate on a 1 inch thick Siporex substrate. The sample specimens were conditioned to equilibrium at 86°±5°F and at a relative humidity of 50±5 percent for approximately 96 hours. The specimens were then placed into "Vapometers" which consist of upper and lower aluminum cups. The lower flat bottomed, circular cup (approximately 3¾ inches diameter and 1½ inches deep) is threaded at its upper outside edge and is connected by means of these screw threads to the upper, larger circular cup (4¾ inches diameter and 1⅜ inches deep), which has matching screw threads on the perimeter of a 3¾ inches diameter hole cut in the flat bottom thereof. A ½ inch wide ledge is thus provided between the upper and lower cups. The lower cup was filled with silica gel, the specimen disc was placed, with the coated face upwards, into the upper cup resting on the ledge and the space between the specimen and the upper cup filled with molten paraffin wax. Using a template, the upper coated surface of the specimen was sealed with molten paraffin around the circumference leaving a circular unsealed opening of 3¾ inches in diameter. The test dishes (Vapometers) were placed into a constant humidity cabinet (Blue M CF-7402 HA) maintained at a temperature of 86°F and a relative humidity of 50 percent. The weight of the Vapometer test dish was measured periodically over a period of approximately 400 hours. The water vapour transmission and permeance were calculated as per sections (11b) (1) and (2) of AASTM C-355.

One sample of each of the four materials was also evaluated for water repellency by subjecting a specimen of each mix to a test, essentially simulating rain under controlled conditions. The gain in weight of the coated specimen as compared to an uncoated control specimen was used to calculate the water absorbancy and thus by difference the water repellency. Two specimens, 9 × 9 × 3 inches thick, of each coating matrix were cut from larger coated Siporex specimens. A blank or control specimen, 9 × 9 × 3 inches thick was cut from a larger uncoated Siporex specimen from the same production batch as the coated specimens. The four edges and one 9 × 9 inches face of the test and control specimens were sealed with molten paraffin wax leaving the coated 9 × 9 inches faces of the test specimens and one normal 9 × 9 inches wire cut face of the control specimen unsealed. The dried weights of the specimens after sealing with wax were recorded to the nearest 0.5 gram (weight A). The specimens were placed on a rack (over a drain) with the 9 × 9 inches unsealed face upwards and inclined at an angle of 15°0 with the horizontal. A shower head 2½ inches in diameter and with 150 holes 1/32 inch diameter, was positioned 24 inches above the central point of the inclined face of the specimen. The water flow through the shower head was pre-adjusted to produce aa pressure of ½ inch of Hg. as measured by a manometer in the 7/16 inch I.D. water line. The specimens were subjected to the water spray for 24 minutes. At the end of this period the specimens were removed from the rack, excess water shaken from the surface and the specimens weighed to the nearest 0.5 gram (weight B). The water repellency was then calculated from the formula Water Repellence = $100 - (B - A/B_c - A_c) \times 100$ where $A$ and $B$ refer to the weights of the test specimen and $A_c$ and $B_c$ refer to the weights of the control specimen.

The test results of water vapour permeability and water repellency are tabulated in the Table below.

TABLE

| Sample | Dry Powder Mix Design % Composition by Weight | | % Fines In Fines Plus-40 To +100 Mesh Portion | % Average Relative $H_2O$ Repellency | Average Permeance (Perms*) |
|---|---|---|---|---|---|
| Siporex Control Blank | 31 No./ft.$^3$ nominal density | | | 0 | 17.8 |
| Mix A | Cement | 40 | | | |
| | Coarse Fraction | 36 | 43 | 97.8 | 3.1 |
| | Fine Fraction | 24 | | | |
| Mix B | Cement | 40 | | | |
| | Coarse Fraction | 42 | 33 | 96.7 | 7.7 |
| | Fine Fraction | 18 | | | |
| Mix C | Cement | 40 | | | |
| | Coarse Fraction | 48 | 22 | 94.4 | 9.0 |
| | Fine Fraction | 12 | | | |
| Mix D | Cement | 40 | | | |
| | Coarse Fraction | 54 | 12 | 93.9 | 9.3 |
| | Fine Fraction | 6 | | | |

*Perms = Grains/Hr. ft.$^2$ 1" Hg.

I claim:

1. A precast concrete building unit comprising a light-weight cellular concrete unit having on at least one face thereof and integral therewith a finishing layer of dense, high-strength concrete material, said dense concrete material consisting essentially of an inorganic cementitious binder, a siliceous aggregate containing a coarse fraction and a fine fraction and between 2 and 12 percent solids based on the total weight of said concrete material of a resin binder, said coarse fraction consisting essentially of aggregate substantially all of which passes through a 30 mesh screen and a portion constituting at least 70 percent of said coarse fraction being in the −40 to +100 mesh range, said fine fraction having a particle size such as less than 10 percent of said fine fraction is retained on a −200 mesh screen, said fine fraction constituting between 12 and 40 percent of the total of said portion and said fine aggregate, the weight ratio of said fine fraction to the total of said portion and said fine fraction and the weight ratio of said resin binder solids to said dense concrete material being coordinated thereby to provide a finishing layer having a water repellency greater than 90 percent and a water vapour permeance of between 6 and 12 perms.

2. A building unit as defined in claim 1 wherein the ratio of said inorganic cementitious binder to said siliceous aggregate is between 1 : 4 and 3 : 4.

3. A building unit as defined in claim 2 wherein said fine fraction constitutes 20 to 40 percent of the total of said portion and said fine fraction.

4. A building unit as defined in claim 2 wherein said resin is an acrylic resin.

5. A building unit as defined in claim 4 wherein said fine fraction constitutes 20 to 40 percent of the total of said portion and said fine fraction.

6. A building unit as defined in claim 1 wherein said fine fraction constitutes 20 to 40 percent of the total of said portion and said fine fraction.

* * * * *